(12) United States Patent
Lei

(10) Patent No.: US 6,804,052 B2
(45) Date of Patent: Oct. 12, 2004

(54) ROD LENS SYSTEM FOR RIGID ENDOSCOPES

(75) Inventor: Fang Lei, Durchhausen (DE)

(73) Assignee: Karl Storz GmbH & Co. KG (DE)

( * ) Notice: Subject to any disclaimer, the term of this patent is extended or adjusted under 35 U.S.C. 154(b) by 0 days.

(21) Appl. No.: 10/657,666

(22) Filed: Sep. 8, 2003

(65) Prior Publication Data

US 2004/0125446 A1 Jul. 1, 2004

Related U.S. Application Data

(63) Continuation of application No. PCT/EP02/07914, filed on Jul. 17, 2002.

(30) Foreign Application Priority Data

Jul. 28, 2001 (DE) .......................... 101 36 956

(51) Int. Cl.[7] .................................. A61B 1/00
(52) U.S. Cl. ....................... 359/435; 600/160
(58) Field of Search ................. 359/434, 435; 600/101, 160

(56) References Cited

U.S. PATENT DOCUMENTS 5,519,532 A * 5/1996 Broome ...................... 359/435
5,568,312 A * 10/1996 Horton ....................... 359/435
5,684,629 A * 11/1997 Leiner ........................ 359/435
5,852,511 A * 12/1998 Tateyama et al. ........... 359/362
5,933,275 A   8/1999 Igarashi ...................... 359/435

FOREIGN PATENT DOCUMENTS

| DE | 1 146 282 | 3/1963 |
| DE | 28 14 236 | 11/1978 |
| DE | 35 27 393 | 2/1987 |
| DE | 36 25 023 | 2/1987 |
| DE | 38 54 156 | 11/1995 |
| DE | 197 20 163 | 11/1997 |
| DE | 197 29 002 | 1/1998 |
| EP | 0 628 843 | 6/1993 |

* cited by examiner

*Primary Examiner*—Mark A. Robinson
(74) *Attorney, Agent, or Firm*—St. Onge Steward Johnston & Reens LLC

(57) ABSTRACT

A linear lens system for rigid endoscopes for the conversion of a distal intermediate image into a proximal intermediate image, is characterized by a first non-symmetrically arranged sequence of two linear lenses, a subsequent odd sequence of similar, non-cemented, symmetrically biconvex linear lenses, and a final sequence of two linear lenses, arranged as a mirror image to the first sequence.

14 Claims, 1 Drawing Sheet

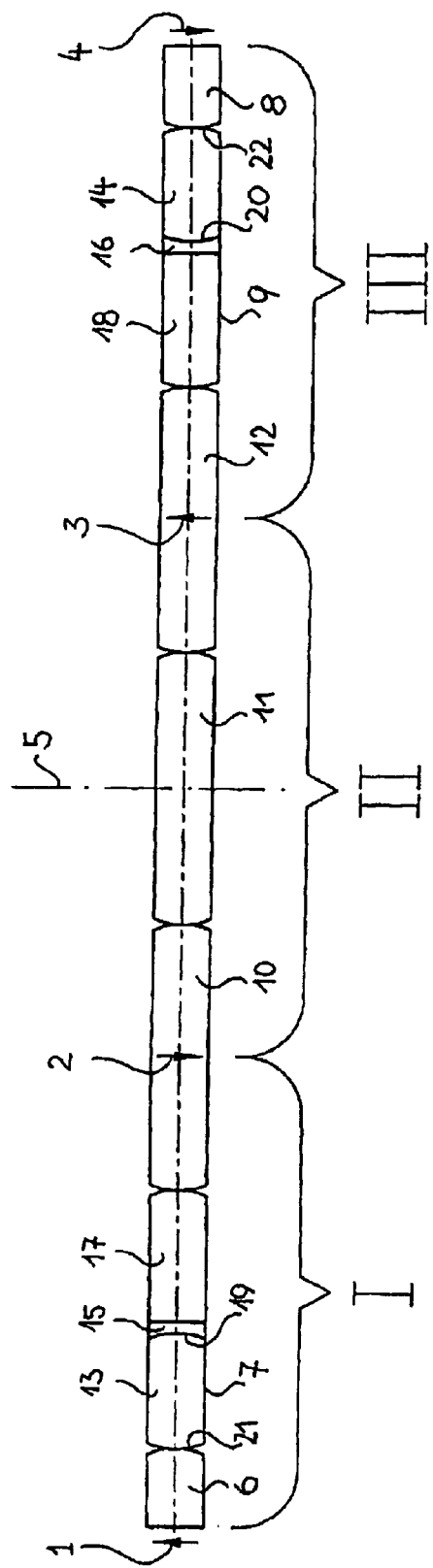

ROD LENS SYSTEM FOR RIGID ENDOSCOPES

This application is a continuation of pending International Patent Application No. PCT/EP02/07914 filed on Jul. 17, 2002 designating the United States and claiming priority from German Patent Application No. 101 36 956.5 filed on Jul. 28, 2001.

FIELD OF THE INVENTION

The invention relates to a linear lens system for rigid endoscopes for the conversion of a distal intermediate image, produced by an objective lens system, into a proximal intermediate image.

Rigid endoscopes are used in particular in medicine or technology for examining hollow spaces such as bodily cavities, engine combustion areas, power units, and the like. On the distal end an objective is arranged, which produces a first intermediate image. This intermediate image is converted by means of a downstream linear lens system into a proximal intermediate image plane, in which it can be observed with an eyepiece or a camera system. Depending on the depth of the hollow area to be examined, various conversion lengths are to be bridged by the linear lens system.

In the process of conversion, the linear lenses, also referred to as relay lenses, produce multiple image relays. The linear lens elements associated with an image relay here are designated as a relay system. An odd number of otherwise equal relay systems are usually presented. On the basis of cost and manufacturing considerations, the elements of the relay systems should be produced in the simplest possible way and should to a great extent be equal. The imaging scale should be 1:1.

Each individual relay system has imaging aberrations, which generally increase with the number of relay systems. To reduce imaging aberrations of the entire system, more complex relay systems, made up of several lens members in known manner, or lens members with varying refractive indexes, can be provided, as described for instance in DE 36 25 023 A1. Remaining imaging aberrations are usually compensated by a countervailing correction of the objective or the eyepiece.

From DE 38 54 156 T2, a single-use endoscope system of simple, economical construction is known, in which the arrangement of objective, conversion and observation lenses is made of a polymer material. The conversion system consists exclusively of a number of symmetric pairs of adjacent rod lenses, configured as identical biconvex lenses with refracting entry and exit surfaces of equal focal length. The objective lens system produces a first intermediate image on the distal entry surface of the conversion system. Additional intermediate images occur as relay images on the lens surfaces at the end of each pair of rod lenses. Out of cost considerations, it was decided to forego a correction of imaging aberrations, especially of the longitudinal chromatic aberration.

From U.S. Pat. No. 5,933,275, a linear lens system is known in which, going from the distal end, a number of relay systems is provided which each consist of two simple, biconvex linear lenses. The intermediate images occur between the relay systems in the air space. All linear lenses are separated from one another by a free space, where the intermediate images, however, are relatively close to the glass surfaces of the linear lenses.

On the proximal end are two biconvex linear lenses, each of whose ends turned toward one another has a negative meniscus lens cemented to it. The refractive index and the relative dispersion of the meniscus lens should be greater than with the linear lens part. In this proximal relay system consisting of cemented members, the longitudinal chromatic aberrations, arising as a whole from the simple relay systems mounted upstream, and the spherical aberrations should be compensated. In order to keep the spherical aberrations of the simple relay systems as small as possible, the linear lenses should be made of a glass with relatively high refractive index and low relative dispersion.

The image field convexity caused by the simple relay systems and the astigmatism should be compensated by a corresponding overcorrection of the objective.

In an additional embodiment, the proximal relay system is cemented to the ends turned toward each of the intermediate images together with a negative meniscus lens with a higher refractive index than the biconvex inner linear lens part. With the additional cemented member, the astigmatism caused by the simple relay systems should also be compensated by corresponding overcorrection.

The aim of this invention was to improve the correction of the imaging aberrations, especially chromatic aberration, with a comparatively simple construction of the linear lens system. It should be possible, in simple manner, to adapt the chromatic correction to a varying number of image relays.

This aim is fulfilled by the invention with a linear lens system of the aforementioned kind, through the defining characteristics of claim 1. Advantageous configurations can be seen in the characteristics of the related claims.

The essential characteristic of the inventive linear lens system is the construction, which is symmetrical as a whole with respect to a central plane, and which can be optimized in image correction more easily and better than an asymmetrical total system. In that system the first and last relay systems are both asymmetric in their own right and are equipped with a bent cemented surface. With both these relay systems, the chromatic aberration of the entire image conversion system is corrected. The task of the chromatic correction is fulfilled here, especially by the first or last bent cemented surface and by different glasses on both sides of the cemented surfaces.

Close to the bent cemented surface in the direction of light, a plane cemented surface can be inserted into the linear lens, which plane cemented surface can support a diaphragm that controls the imaging beams. The position of the plane cemented surface can be selected in such a way that it is conjugate to the aforementioned center plane, so that an additional symmetry is achieved in the overall construction.

The other relay systems are also symmetric in themselves and consist of equal simple linear lenses without any cemented surface at all. The radii and the length of the simple linear lenses are arranged so that a telecentric beam entrance is achieved both for the intermediate images and for the pupils of the linear lenses and the spherical aberration and coma are corrected. Through the symmetrical construction of the intermediate relays, the aberrations, such as distortion and chromatic cross-aberration for instance, are removed. Remaining image field convexity is corrected in normal manner by the objective.

According to the invention, even at the entrance into the image conversion system, part of the chromatic correction is carried out, to counteract chromatic distortion caused by the subsequent simple linear lenses. An equal part is not corrected until exit from the image conversion system. In passing through the image conversion system, the intermediate images are therefore accompanied by a smaller chromatic distortion on average, which is also corrected overall symmetrically to the center plane of the entire image conversion system.

The relay images lie in the center planes of the simple linear lenses and thus far from the glass-air surfaces. Impurities on these surfaces therefore have only a very small impact on image quality.

An embodiment with three image relays is shown schematically in the illustration.

In the linear lens system shown in the illustration, the linear lens elements belonging to a relay system are outlined by the brackets labeled I, II, III. The relay system I produces a first relay image from the distal intermediate image 1 within a linear lens element. The second relay system II also produces an additional relay image 3 within a linear lens element, which relay image is imaged by the relay system III into the proximal image plane as a relay intermediate image 4. With an eyepiece (not illustrated), an upright image of the observation subject can then be observed.

The entire linear lens system is constructed symmetrically to a center plane 5. The first two linear lenses 6, 7 are asymmetrical in themselves, but are mirror images with the linear lenses 8, 9 arranged on the proximal end to the center plane 5. All other linear lenses 10, 11, 12 are equal to one another and likewise arranged symmetrically to the center plane 5. Because of the complete symmetry of the linear lens system to the center plane 5, one part of the aberrations, such as the distortion and chromatic cross-aberration, is already corrected. The longitudinal chromatic aberration is compensated in particular by the bent cemented surface and the glass varieties of the linear lenses 7, 9 belonging to the first or last relay system.

The linear lenses 7, 9, moreover, each consist of a biconvex linear lens member 13, 14, a plano-concave intermediate member 15, 16, and a plano-concave linear lens member 17, 18. Color correction is carried out in particular over the radius 19, 20 of the cemented surface between the linear lens member 13, 14 and the intermediate member 15, 16 as well as by glasses with varying relative partial dispersion on both sides of the cemented surface. It has proved advantageous to select a glass with low partial dispersion for the linear lens member 13, 14 and a glass with high partial dispersion for the intermediate member 15, 16. Over the radius 21, 22 of the beam entrance or exit surface of the linear lens member 13, 14 and its refractive index, the portion of the longitudinal chromatic aberration that depends on the number of image relays can also be taken into account. It has proved advantageous to have a high refractive index both for the linear lens member 13, 14 and the intermediate member 15, 16. With linear lens systems with varying length of the image conversion system, it is therefore necessary only to replace the linear lens 7, 9.

A diaphragm (not illustrated) can be inserted into the plane cemented surface of the linear lens 7, 9, for instance through vapor deposit. The position of the plane surface is conjugate to the center plane 5. Instead of the cemented surface, it is also possible to provide a small air space in this position, so that a separate mechanical diaphragm can be added.

The linear lens member 17, 18 can advantageously be manufactured of the same glass as the subsequent simple linear lenses 10, 11, 12 and can have the same radius on its convex side as these. The length of the linear lens member 17, 18 then proves to be half the length of the linear lenses 10, 11, 12.

The linear lenses 10, 11, 12 are identical to one another and each individually is symmetrically biconvex. As can be seen from the illustration, the previously described imaging and correction principles are already given when a single linear lens 10 is put in place. The proximal intermediate image 4 in this case is upright. Such an imaging is advantageous for observation with a camera system. As shown in the figure and its description, by adding two more of these linear lenses it is possible to achieve an extension of the image conversion system with an additional image relay.

The radii and length of the linear lenses 10, 11, 12 should be arranged so that the telecentric beam entrance required for the image conversion system is provided, both for all intermediate images and for the pupils, and the aperture aberration and coma are corrected. Because of the symmetrical system structure, it has proven favorable to have a glass with relatively low refractive index and low partial dispersion for these simple linear lenses.

In the illustrated embodiment, the individual linear lenses can be filled sequentially in a rigid endoscope tube (not illustrated), because they are in immediate contact with one another without air space. Because of the symmetry of the structure, installation errors are avoided. The great number of identical linear lens elements allows for streamlined production and storage.

Construction data for a preferred embodiment with seven relays are listed in the following chart. Departures from the construction data are permissible in the framework of customary production tolerances.

| Surface No.1 | Radius (mm) | Distance (mm) | Refractive n | Imaging No. v |
|---|---|---|---|---|
| Intermediate Image | Plane | 3.4 | Air | |
| 1 | Plane | 7.0 | 1.52 | 64.1 |
| 2 | −7.9 | 0 | Air | |
| 3 | 8.4 | 10.0 | 1.74 | 44.7 |
| 4 | −1.2 | 1.0 | 1.78 | 26.1 |
| 5 | Plane | 0 | Air | |
| 6 | Plane | 11.6 | 1.52 | 64.1 |
| 7 | −7.9 | 0 | Air | |
| 8 | 7.9 | 23.2 | 1.52 | 64.1 |
| 9 | −7.9 | 0 | Air | |
| 10 | 7.9 | 23.2 | 1.52 | 64.1 |
| 11 | −7.9 | 0 | Air | |
| 12 | 7.9 | 23.2 | 1.52 | 64.1 |
| 13 | −7.9 | 0 | Air | |
| 14 | 7.9 | 23.2 | 1.52 | 64.1 |
| 15 | −7.9 | 0 | Air | |
| 16 | 7.9 | 23.2 | 1.52 | 64.1 |
| 17 | −7.9 | 0 | Air | |
| 18 | 7.9 | 23.2 | 1.52 | 64.1 |
| 19 | −7.9 | 0 | Air | |
| 20 | 7.9 | 23.2 | 1.52 | 64.1 |
| 21 | −7.9 | 0 | Air | |
| 22 | 7.9 | 23.2 | 1.52 | 64.1 |
| 23 | −7.9 | 0 | Air | |
| 24 | 7.9 | 23.2 | 1.52 | 64.1 |
| 25 | −7.9 | 0 | Air | |
| 26 | 7.9 | 23.2 | 1.52 | 64.1 |
| 27 | −7.9 | 0 | Air | |
| 28 | 7.9 | 23.2 | 1.52 | 64.1 |
| 29 | −7.9 | 0 | Air | |
| 30 | 7.9 | 23.2 | 1.52 | 64.1 |
| 31 | Plane | 0 | Air | |
| 32 | Plane | 1.0 | 1.78 | 26.1 |
| 33 | 1.2 | 10.0 | 1.74 | 44.7 |
| 34 | −8.4 | 0 | Air | |
| 35 | 7.9 | 7.0 | 1.62 | 64.1 |
| 36 | Plane | 3.4 | Air | |
| Intermediate Image | Plane | 0 | Air | |

What is claimed is:

1. Linear lens system for rigid endoscopes for conversion of a distal intermediate image produced by an objective lens system into a proximal intermediate image, which has, through a first asymmetrically constructed series of two linear lenses, a connecting odd-numbered series of equal, non-cemented, symmetrically biconvex linear lenses, whereby within each odd-numbered linear lens of this series a relay image of the previous intermediate image is formed, and a final series of two linear lenses, which is arranged as a mirror image to the first series.

2. Linear lens system according to claim 1, wherein the first and last series each consist of a plano-convex linear lens and a simply cemented biconvex linear lens situated close to the distal or proximal intermediate image.

3. Linear lens system according to claim 2, wherein the cemented linear lens consists of a biconvex linear lens member, a plano-concave intermediate member, and a plano-convex linear lens member.

4. Linear lens system according to claim 3, wherein the forward radius and the radius of the cemented surface of the biconvex linear lens member with the intermediate member, as well as the glass parameters of these lens members are selected so that nearly all chromatic aberrations of the entire image conversion system are corrected.

5. Linear lens system according to claim 4, wherein the biconvex linear lens member consists of a glass with low partial dispersion and the intermediate member consists of a glass with high partial dispersion, whereby the refractive index is high for both lens members.

6. Linear lens system according to claim 3, wherein the plane surface inside the cemented linear lens is arranged conjugate to a center plane of the linear lens system.

7. Linear lens system according to claim 6, wherein a diaphragm is inserted into the plane surface.

8. Linear lens system according to claim 7, wherein the optical parameters of the first series of linear lenses together with those of the first linear lens are selected from the subsequent series in such a way that in the center plane of this linear lens a first relay image of the distal intermediate image appears.

9. Linear lens system according to claim 1, wherein the odd-numbered series consists of at least three equal linear lenses.

10. Linear lens system according to claim 9, wherein the optical parameters of the three equal linear lenses are selected so that in the center plane of the third linear lens an additional relay image appears.

11. Linear lens system according to claim 10, wherein one or several series of two equal linear lenses each are adjoined to the series of the three equal linear lenses.

12. Linear lens system according to claim 11, wherein the radii and lengths of the respective equal linear lenses are selected so that a telecentric beam entrance occurs both for the intermediate images and for the pupils of the linear lens system.

13. Linear lens system according to claim 12, wherein the linear lenses consist of a glass with relatively low refractive index and low partial dispersion.

14. Linear lens system according to claim 1 with seven relays, characterized by the following construction parameters:

| Surface No.1 | Radius (mm) | Distance (mm) | Refractive n | Imaging No. v |
|---|---|---|---|---|
| Intermediate Image | Plane | 3.4 | Air | |
| 1 | Plane | 7.0 | 1.52 | 64.1 |
| 2 | −7.9 | 0 | Air | |
| 3 | 8.4 | 10.0 | 1.74 | 44.7 |
| 4 | −1.2 | 1.0 | 1.78 | 26.1 |
| 5 | Plane | 0 | Air | |
| 6 | Plane | 11.6 | 1.52 | 64.1 |
| 7 | −7.9 | 0 | Air | |
| 8 | 7.9 | 23.2 | 1.52 | 64.1 |
| 9 | −7.9 | 0 | Air | |
| 10 | 7.9 | 23.2 | 1.52 | 64.1 |
| 11 | −7.9 | 0 | Air | |
| 12 | 7.9 | 23.2 | 1.52 | 64.1 |
| 13 | −7.9 | 0 | Air | |
| 14 | 7.9 | 23.2 | 1.52 | 64.1 |
| 15 | −7.9 | 0 | Air | |
| 16 | 7.9 | 23.2 | 1.52 | 64.1 |
| 17 | −7.9 | 0 | Air | |
| 18 | 7.9 | 23.2 | 1.52 | 64.1 |
| 19 | −7.9 | 0 | Air | |
| 20 | 7.9 | 23.2 | 1.52 | 64.1 |
| 21 | −7.9 | 0 | Air | |
| 22 | 7.9 | 23.2 | 1.52 | 64.1 |
| 23 | −7.9 | 0 | Air | |
| 24 | 7.9 | 23.2 | 1.52 | 64.1 |
| 25 | −7.9 | 0 | Air | |
| 26 | 7.9 | 23.2 | 1.52 | 64.1 |
| 27 | −7.9 | 0 | Air | |
| 28 | 7.9 | 23.2 | 1.52 | 64.1 |
| 29 | −7.9 | 0 | Air | |
| 30 | 7.9 | 23.2 | 1.52 | 64.1 |
| 31 | Plane | 0 | Air | |
| 32 | Plane | 1.0 | 1.78 | 26.1 |
| 33 | 1.2 | 10.0 | 1.74 | 44.7 |
| 34 | −8.4 | 0 | Air | |
| 35 | 7.9 | 7.0 | 1.62 | 64.1 |
| 36 | Plane | 3.4 | Air | |
| Intermediate Image | Plane | 0 | Air | |

* * * * *